United States Patent
Zhang et al.

(10) Patent No.: US 10,028,136 B2
(45) Date of Patent: Jul. 17, 2018

(54) NEGOTIATION PROCESSING METHOD FOR SECURITY ALGORITHM, CONTROL NETWORK ELEMENT, AND CONTROL SYSTEM

(71) Applicant: Huawei Technologies Co., Ltd., Shenzhen (CN)

(72) Inventors: Bo Zhang, Shenzhen (CN); Chengdong He, Dongguan (CN); Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 15/143,095

(22) Filed: Apr. 29, 2016

(65) Prior Publication Data

US 2016/0249209 A1  Aug. 25, 2016

Related U.S. Application Data

(63) Continuation of application No. PCT/CN2014/081488, filed on Jul. 2, 2014.

(30) Foreign Application Priority Data

Nov. 4, 2013 (CN) .......................... 2013 1 0539031

(51) Int. Cl.
*H04L 29/06* (2006.01)
*H04W 12/04* (2009.01)
(Continued)

(52) U.S. Cl.
CPC .......... *H04W 12/04* (2013.01); *H04L 9/0816* (2013.01); *H04L 63/205* (2013.01); *H04W 76/14* (2018.02)

(58) Field of Classification Search
CPC ..... H04L 63/20; H04L 63/205; H04L 9/0816; H04W 12/04; H04W 76/023
See application file for complete search history.

(56) References Cited

U.S. PATENT DOCUMENTS 7,591,012 B2 * 9/2009 Jaganathan .............. H04L 9/06
380/278
2006/0150241 A1 7/2006 Huh et al.
(Continued)

FOREIGN PATENT DOCUMENTS

CN 101001252 A 7/2007
CN 101562667 A 10/2009
(Continued)

OTHER PUBLICATIONS

"3rd Generation Partnership Project; Technical Specification Group Services and System Aspects; Study on architecture enhancements to support Proximity-based Services (ProSe) (Release 12)," 3GPP TR 23.703, V0.7.1, Technical Report, Sep. 2013, 262 pages.
(Continued)

*Primary Examiner* — Khang Do
(74) *Attorney, Agent, or Firm* — Conley Rose, P.C.

(57) ABSTRACT

A negotiation processing method for a security algorithm, a control network element, and a control system where the negotiation processing method for a security algorithm includes selecting, by a control network element according to a security capability of first user equipment (UE) and a security capability of second UE, a security algorithm supported by both the first UE and the second UE, and notifying, by the control network element, the selected security algorithm to the first UE and the second UE, and hence, negotiation of a security algorithm between two UEs in proximity communication can be implemented under the control of a control network element.

15 Claims, 5 Drawing Sheets

(51) Int. Cl.
*H04L 9/08* (2006.01)
*H04W 76/14* (2018.01)

(56) References Cited

U.S. PATENT DOCUMENTS

| | | | |
|---|---|---|---|
| 2010/0329465 A1 | 12/2010 | Emeott et al. | |
| 2011/0082940 A1 | 4/2011 | Montemurro et al. | |
| 2011/0246762 A1 | 10/2011 | Adams et al. | |
| 2012/0066737 A1* | 3/2012 | Zhang | H04L 63/20 726/1 |
| 2012/0148044 A1* | 6/2012 | Fang | H04L 63/0428 380/255 |
| 2013/0022100 A1 | 1/2013 | Liao et al. | |
| 2013/0102270 A1* | 4/2013 | Suh | H04W 4/22 455/404.1 |
| 2013/0179688 A1 | 7/2013 | Lee et al. | |
| 2013/0303088 A1* | 11/2013 | Watfa | H04W 4/008 455/41.2 |
| 2013/0324114 A1* | 12/2013 | Raghothaman | H04W 76/023 455/426.1 |
| 2016/0165491 A1* | 6/2016 | Liu | H04W 12/02 370/331 |

FOREIGN PATENT DOCUMENTS

| | | |
|---|---|---|
| CN | 101854625 A | 10/2010 |
| CN | 101997679 A | 3/2011 |
| CN | 102223201 A | 10/2011 |
| CN | 103329589 A | 9/2013 |
| EP | 2469753 A1 | 6/2012 |
| WO | 2013118096 A1 | 8/2013 |

OTHER PUBLICATIONS

"3rd Generation Partnership Project; Technical Specification Group Services and System Aspects, Study on security issue to support Proximity Services (Release 12)," 3GPP TR 33.cde, V0.2.0, Technical Support, Jul. 2013, 21 pages.

Foreign Communication From a Counterpart Application, European Application No. 14857820.6, Extended European Search Report dated Jul. 28, 2016, 8 pages.

Foreign Communication From a Counterpart Application, PCT Application No. PCT/CN2014/081488, English Translation of International Search Report dated Oct. 10, 2014, 2 pages.

Foreign Communication From a Counterpart Application, PCT Application No. PCT/CN2014/081488, English Translation of Written Opinion dated Oct. 10, 2014, 9 pages.

Machine Translation and Abstract of Chinese Publication No. CN101001252, Jul. 18, 2007, 12 pages.

Foreign Communication From a Counterpart Application, Chinese Application No. 201310539031.X, Chinese Office Action dated Apr. 28, 2017, 11 pages.

Machine Translation and Abstract of Chinese Publication No. CN101854625, Oct. 6, 2010, 32 pages.

Foreign Communication From a Counterpart Application, Chinese Application No. 201310539031.X, Chinese Office Action dated Apr. 10, 2018, 9 pages.

* cited by examiner

NEGOTIATION PROCESSING METHOD FOR SECURITY ALGORITHM, CONTROL NETWORK ELEMENT, AND CONTROL SYSTEM

CROSS-REFERENCE TO RELATED APPLICATIONS

This application is a continuation of International Application No. PCT/CN2014/081488, filed on Jul. 2, 2014, which claims priority to Chinese Patent Application No. 201310539031.X, filed on Nov. 4, 2013, both of which are hereby incorporated by reference in their entireties.

TECHNICAL FIELD

Embodiments of the present disclosure relate to communications technologies, and in particular, to a negotiation processing method for a security algorithm, a control network element, and a control system.

BACKGROUND

In an application scenario of proximity communication, an operator network is not required in communication between two user equipments (UE). An objective of a proximity communication service (ProSe) technology is to set up a secure communication channel between two UEs in order to exchange data securely.

The ProSe technology mainly includes two aspects: ProSe discovery and ProSe communication. In a stage of ProSe discovery, the two UEs can detect each other to implement authentication of identities of the two UEs. In a stage of ProSe communication, the two UEs may set up a secure communication channel and then perform secure data communication. Because a communication channel between UEs is susceptible to interception and tampering by an attacker, confidentiality protection and integrity protection need to be performed on communication data. However, the confidentiality protection and integrity protection need to be supported by a secure key and a crypto algorithm. Because security algorithms supported by UEs may be not identical, negotiation of a security algorithm needs to be performed before secure communication.

Therefore, how two UEs in proximity communication perform negotiation of a security algorithm becomes a technical problem to be resolved urgently.

SUMMARY

Embodiments of the present disclosure provide a negotiation processing method for a security algorithm, a control network element, and a control system.

According to a first aspect, a negotiation processing method for a security algorithm is provided, including selecting, by a control network element according to a security capability of first UE and a security capability of second UE, a security algorithm supported by both the first UE and the second UE, and notifying, by the control network element, the selected security algorithm to the first UE and the second UE.

With reference to the first aspect, in a first implementation manner, selecting, by a control network element according to a security capability of first UE and a security capability of second UE, a security algorithm supported by both the first UE and the second UE includes randomly selecting, by the control network element from an intersection of a security algorithm supported by the first UE and included in the security capability of the first UE and a security algorithm supported by the second UE and included in the security capability of the second UE, one security algorithm as the security algorithm supported by both the first UE and the second UE.

With reference to the first implementation manner, in a second implementation manner, the control network element includes a first control network element attached by the first UE and a second control network element attached by the second UE, and randomly selecting, by the control network element from an intersection of a security algorithm supported by the first UE and included in the security capability of the first UE and a security algorithm supported by the second UE and included in the security capability of the second UE, one security algorithm as the security algorithm supported by both the first UE and the second UE includes sending, by the first control network element, a first algorithm list to the second control network element, where the first algorithm list includes the security algorithm supported by the first UE, and randomly selecting, by the second control network element from an intersection of the first algorithm list and a second algorithm list that includes the security algorithm supported by the second UE, one security algorithm as the security algorithm supported by both the first UE and the second UE.

With reference to the first implementation manner, in a third implementation manner, the control network element includes a first control network element attached by the first UE and a second control network element attached by the second UE, and randomly selecting, by the control network element from an intersection of a security algorithm supported by the first UE and included in the security capability of the first UE and a security algorithm supported by the second UE and included in the security capability of the second UE, one security algorithm as the security algorithm supported by both the first UE and the second UE includes selecting, by the first control network element according to an intersection of a preconfigured security algorithm list and a security algorithm list that is supported by the first UE, a first algorithm list corresponding to the first UE, sending, by the first control network element, the first algorithm list to the second control network element, selecting, by the second control network element according to an intersection of the preconfigured security algorithm list and a security algorithm list that is supported by the second UE, a second algorithm list corresponding to the second UE, and randomly selecting, by the second control network element from an intersection of the first algorithm list and the second algorithm list, one security algorithm as the security algorithm supported by both the first UE and the second UE.

With reference to the first aspect, in a fourth implementation manner, selecting, by a control network element according to a security capability of first UE and a security capability of second UE, a security algorithm supported by both the first UE and the second UE includes selecting, by the control network element according to an intersection of a preconfigured security algorithm priority list and a security algorithm that is supported by the first UE, a first ordered algorithms list corresponding to the first UE, selecting, according to an intersection of the security algorithm priority list and a security algorithm that is supported by the second UE, a second ordered algorithms list corresponding to the second UE, and selecting, from an intersection of the first ordered algorithms list and the second ordered algorithms list using an algorithm selection policy, the security algorithm supported by both the first UE and the second UE.

With reference to the fourth implementation manner, in a fifth implementation manner, the control network element includes a first control network element attached by the first UE and a second control network element attached by the second UE, and selecting, by the control network element according to an intersection of a preconfigured security algorithm priority list and a security algorithm that is supported by the first UE, a first ordered algorithms list corresponding to the first UE, selecting, according to an intersection of the security algorithm priority list and a security algorithm that is supported by the second UE, a second ordered algorithms list corresponding to the second UE, and selecting, from an intersection of the first ordered algorithms list and the second ordered algorithms list using an algorithm selection policy, the security algorithm supported by both the first UE and the second UE includes selecting, by the first control network element according to the intersection of the preconfigured security algorithm priority list and the security algorithm that is supported by the first UE, the first ordered algorithms list corresponding to the first UE, and sending the first ordered algorithms list to the second control network element, and selecting, by the second control network element according to the intersection of the security algorithm priority list and the security algorithm that is supported by the second UE, the second ordered algorithms list corresponding to the second UE, and selecting, from the intersection of the first ordered algorithms list and the second ordered algorithms list using the algorithm selection policy, the security algorithm supported by both the first UE and the second UE.

With reference to the second, third or fifth implementation manner, in a sixth implementation manner, notifying, by the control network element, the selected security algorithm to the first UE and the second UE includes sending, by the second control network element, the selected security algorithm to the second UE, and sending, by the second control network element, the selected security algorithm to the first UE using the first control network element.

With reference to the fourth implementation manner, in a seventh implementation manner, the control network element includes a first control network element attached by the first UE and a second control network element attached by the second UE, and selecting, by the control network element according to an intersection of a preconfigured security algorithm priority list and a security algorithm that is supported by the first UE, a first ordered algorithms list corresponding to the first UE, selecting, according to an intersection of the security algorithm priority list and a security algorithm that is supported by the second UE, a second ordered algorithms list corresponding to the second UE, and selecting, from an intersection of the first ordered algorithms list and the second ordered algorithms list using an algorithm selection policy, the security algorithm supported by both the first UE and the second UE includes selecting, by the first control network element according to the intersection of the preconfigured security algorithm priority list and the security algorithm that is supported by the first UE, the first ordered algorithms list corresponding to the first UE, and sending the first ordered algorithms list to the second control network element, selecting, by the second control network element according to the intersection of the security algorithm priority list and the security algorithm that is supported by the second UE, the second ordered algorithms list corresponding to the second UE, selecting, from the intersection of the first ordered algorithms list and the second ordered algorithms list by the second control network element using the algorithm selection policy, the security algorithm supported by both the first UE and the second UE, and sending, by the second control network element, the second ordered algorithms list to the first control network element, and selecting, by the first control network element from the intersection of the first ordered algorithms list and the second ordered algorithms list using the algorithm selection policy, the security algorithm supported by both the first UE and the second UE.

With reference to the seventh implementation manner, in an eighth implementation manner, notifying, by the control network element, the selected security algorithm to the first UE and the second UE includes sending, by the first control network element, the selected security algorithm to the first UE, and sending, by the second control network element, the selected security algorithm to the second UE.

With reference to the fourth, fifth, seventh or eighth implementation manner, in a ninth implementation manner, selecting, from an intersection of the first ordered algorithms list and the second ordered algorithms list using an algorithm selection policy, the security algorithm supported by both the first UE and the second UE includes traversing the first ordered algorithms list and the second ordered algorithms list in a descending order of priority, and selecting a same security algorithm that appears first and that has same priorities as the security algorithm supported by both the first UE and the second UE.

With reference to any one of the first to the ninth implementation manners, in a tenth implementation manner, the method further includes using a preset security algorithm as the security algorithm supported by both the first UE and the second UE if there is no intersection of security algorithms.

According to a second aspect, a control network element is provided, including a selection module configured to select, according to a security capability of first UE and a security capability of second UE, a security algorithm supported by both the first UE and the second UE, and a notification module configured to notify the selected security algorithm to the first UE and the second UE.

With reference to the second aspect, in a first implementation manner, the selection module is further configured to randomly select, from an intersection of a security algorithm supported by the first UE and included in the security capability of the first UE and a security algorithm supported by the second UE and included in the security capability of the second UE, one security algorithm as the security algorithm supported by both the first UE and the second UE, or select, according to an intersection of a preconfigured security algorithm priority list and a security algorithm that is supported by the first UE, a first ordered algorithms list corresponding to the first UE, select, according to an intersection of the security algorithm priority list and a security algorithm that is supported by the second UE, a second ordered algorithms list corresponding to the second UE, and select, from an intersection of the first ordered algorithms list and the second ordered algorithms list using an algorithm selection policy, the security algorithm supported by both the first UE and the second UE.

With reference to the first implementation manner, in a second implementation manner, the selection module is further configured to traverse the first ordered algorithms list and the second ordered algorithms list in a descending order of priority, and select a same security algorithm that appears first and that has same priorities as the security algorithm supported by both the first UE and the second UE.

With reference to the first implementation manner or the second implementation manner, in a third implementation manner, the selection module is further configured to use a preset default security algorithm as the security algorithm supported by both the first UE and the second UE, if there is no intersection of security algorithms.

With reference to any one of the foregoing implementation manners, in a fourth implementation manner, the control network element is a mobility management entity (MME).

According to a third aspect, a control system is provided, including a first control network element attached by first UE and a second control network element attached by second UE, where the first control network element and the second control network element interact in order to select, according to a security capability of the first UE and a security capability of the second UE, a security algorithm supported by both the first UE and the second UE, and notify the selected security algorithm to the first UE and the second UE.

With reference to the third aspect, in a first implementation manner, the first control network element and the second control network element interact in order to randomly select, from an intersection of a security algorithm supported by the first UE and included in the security capability of the first UE and a security algorithm supported by the second UE and included in the security capability of the second UE, one security algorithm as the security algorithm supported by both the first UE and the second UE.

With reference to the first implementation manner, in a second implementation manner, the first control network element is further configured to send a first algorithm list to the second control network element, where the first algorithm list includes the security algorithm supported by the first UE, and the second control network element is further configured to randomly select, from an intersection of the first algorithm list and a second algorithm list that includes the security algorithm supported by the second UE, one security algorithm as the security algorithm supported by both the first UE and the second UE.

With reference to the first implementation manner, in a third implementation manner, the first control network element is further configured to select, according to an intersection of a preconfigured security algorithm list and a security algorithm list that is supported by the first UE, a first algorithm list corresponding to the first UE, and send the first algorithm list to the second control network element, and the second control network element is further configured to select, according to an intersection of the preconfigured security algorithm list and a security algorithm list that is supported by the second UE, a second algorithm list corresponding to the second UE, and randomly select, from an intersection of the first algorithm list and the second algorithm list, one security algorithm as the security algorithm supported by both the first UE and the second UE.

With reference to the first implementation manner, in a fourth implementation manner, the first control network element and the second control network element interact in order to select, according to an intersection of a preconfigured security algorithm priority list and a security algorithm that is supported by the first UE, a first ordered algorithms list corresponding to the first UE, select, according to an intersection of the security algorithm priority list and a security algorithm that is supported by the second UE, a second ordered algorithms list corresponding to the second UE, and select, from an intersection of the first ordered algorithms list and the second ordered algorithms list using an algorithm selection policy, the security algorithm supported by both the first UE and the second UE.

With reference to the fourth implementation manner, in a fifth implementation manner, the first control network element is further configured to select, according to the intersection of the preconfigured security algorithm priority list and the security algorithm that is supported by the first UE, the first ordered algorithms list corresponding to the first UE, and send the first ordered algorithms list to the second control network element, and the second control network element is further configured to select, according to the intersection of the security algorithm priority list and the security algorithm that is supported by the second UE, the second ordered algorithms list corresponding to the second UE, and select, from the intersection of the first ordered algorithms list and the second ordered algorithms list using the algorithm selection policy, the security algorithm supported by both the first UE and the second UE.

With reference to any one of the second to the fourth implementation manners, in a sixth implementation manner, the second control network element is further configured to send the selected security algorithm to the second UE, and the second control network element sends the selected security algorithm to the first UE using the first control network element.

With reference to the fourth implementation manner, in a seventh implementation manner, the first control network element is further configured to select, according to the intersection of the preconfigured security algorithm priority list and the security algorithm that is supported by the first UE, the first ordered algorithms list corresponding to the first UE, and send the first ordered algorithms list to the second control network element. The second control network element is further configured to select, according to the intersection of the security algorithm priority list and the security algorithm that is supported by the second UE, the second ordered algorithms list corresponding to the second UE, select, from the intersection of the first ordered algorithms list and the second ordered algorithms list using the algorithm selection policy, the security algorithm supported by both the first UE and the second UE, and send the second ordered algorithms list to the first control network element, and the first control network element is further configured to select, from the intersection of the first ordered algorithms list and the second ordered algorithms list using the algorithm selection policy, the security algorithm supported by both the first UE and the second UE.

With reference to the seventh implementation manner, in an eighth implementation manner, the first control network element is further configured to send the selected security algorithm to the first UE, and the second control network element is further configured to send the selected security algorithm to the second UE.

With reference to any one of the foregoing implementation manners, in a ninth implementation manner, the control network element is a MME.

In the embodiments of the present disclosure, when first UE and second UE that need to perform proximity communication negotiate a security algorithm, a control network element on a network side may participate and control a process of the negotiation and a negotiation result. As a decision maker on a security algorithm, the control network element may select, according to a security capability of the first UE and a security capability of the second UE, a security algorithm supported by both the UEs, and notify the security algorithm to both the UEs such that the first UE and the second UE can perform proximity communication using the notified security algorithm. In the embodiments, the control network element may be a control network element in an existing network architecture such that the control network element is compatible with the existing network architecture. Moreover, the control network element may be maintained by an operator, and therefore, the operator may participate and control a process of negotiating a security algorithm and a negotiation result, thereby ensuring controllability of negotiation. Moreover, if a control network element controlled by the operator performs a process of negotiating a security algorithm, unreliability of selection of a security algorithm by only UE can be avoided. In addition, because security capabilities of the first UE and the second UE may be transmitted to the control network element in a process in which the first UE and the second UE are attached to the control network element, in the embodiments, an existing process of transmitting network signaling may further be used, thereby achieving compatibility with an existing process of network communication.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
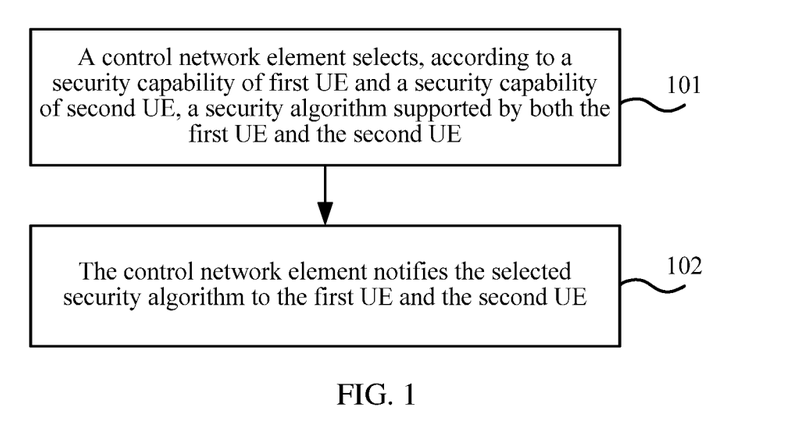
FIG. 1 is a flowchart of Embodiment 1 of a negotiation processing method for a security algorithm according to the present disclosure.

FIG. 1 is a flowchart of Embodiment 1 of a negotiation processing method for a security algorithm according to the present disclosure. As shown in FIG. 1, the method in this embodiment may include:

Step S101: A control network element selects, according to a security capability of first UE and a security capability of second UE, a security algorithm supported by both the first UE and the second UE.

Further, the control network element may receive a request message sent by the first UE, where the request message is sent after or before the first UE receives a proximity communication connection request message sent by the second UE.

Step S102: The control network element notifies the selected security algorithm to the first UE and the second UE.

Optionally, before step S101, the method may further include acquiring, by a control network element, a security capability of first UE and a security capability of second UE in a process in which the first UE and the second UE are attached to the control network element.

Optionally, the foregoing step S101 may be implemented in the following two manners.

Manner 1: The control network element randomly selects, from an intersection of a security algorithm supported by the first UE and included in the security capability of the first UE and a security algorithm supported by the second UE and included in the security capability of the second UE, one security algorithm as the security algorithm supported by both the first UE and the second UE.

Manner 2: The control network element selects, according to an intersection of a preconfigured security algorithm priority list and a security algorithm that is supported by the first UE, a first ordered algorithms list corresponding to the first UE, selects, according to an intersection of the security algorithm priority list and a security algorithm that is supported by the second UE, a second ordered algorithms list corresponding to the second UE, and selects, from an intersection of the first ordered algorithms list and the second ordered algorithms list using an algorithm selection policy, the security algorithm supported by both the first UE and the second UE.

In specific implementation, the first UE and the second UE not only may be attached to a same control network element, but also may be attached to different control network elements.

For the foregoing Manner 1, if control network elements attached by the first UE and the second UE are different, for example, the first UE is attached to a first control network element, and the second UE is attached to a second control network element, Manner 1 may further have the following two processing processes.

Processing Process 1:

The first control network element sends a first algorithm list to the second control network element, where the first algorithm list includes the security algorithm supported by the first UE.

The second control network element randomly selects, from an intersection of the first algorithm list and a second algorithm list that includes the security algorithm supported by the second UE, one security algorithm as the security algorithm supported by both the first UE and the second UE.

Processing Process 2:

The first control network element selects, according to an intersection of a preconfigured security algorithm list and a security algorithm list that is supported by the first UE, a first algorithm list corresponding to the first UE.

The first control network element sends the first algorithm list to the second control network element.

The second control network element selects, according to an intersection of the preconfigured security algorithm list and a security algorithm list that is supported by the second UE, a second algorithm list corresponding to the second UE.

The second control network element randomly selects, from an intersection of the first algorithm list and the second algorithm list, one security algorithm as the security algorithm supported by both the first UE and the second UE.

Correspondingly, step S102 of notifying, by the control network element, the selected security algorithm to the first UE and the second UE may be further includes sending, by the second control network element, the selected security algorithm to the second UE, and sending, by the second control network element, the selected security algorithm to the first UE using the first control network element.

Similarly, for the foregoing Manner 2, if the first UE is attached to the first control network element, and the second UE is attached to the second control network element, Manner 2 may further have the following two processing processes.

Processing Process 1:

The first control network element selects, according to the intersection of the preconfigured security algorithm priority list and the security algorithm that is supported by the first UE, the first ordered algorithms list corresponding to the first UE, and sends the first ordered algorithms list to the second control network element. selecting, by the second control network element according to the intersection of the security algorithm priority list and the security algorithm that is supported by the second UE, the second ordered algorithms list corresponding to the second UE, and selecting, from the intersection of the first ordered algorithms list and the second ordered algorithms list using the algorithm selection policy, the security algorithm supported by both the first UE and the second UE.

Correspondingly, step S102 of notifying, by the control network element, the selected security algorithm to the first UE and the second UE may further include sending, by the second control network element, the selected security algorithm to the second UE, and sending, by the second control network element, the selected security algorithm to the first UE using the first control network element.

Processing Process 2:

The first control network element selects, according to the intersection of the preconfigured security algorithm priority list and the security algorithm that is supported by the first UE, the first ordered algorithms list corresponding to the first UE, and sends the first ordered algorithms list to the second control network element.

The second control network element selects, according to the intersection of the security algorithm priority list and the security algorithm that is supported by the second UE, the second ordered algorithms list corresponding to the second UE.

The second control network element selects, from the intersection of the first ordered algorithms list and the second ordered algorithms list using the algorithm selection policy, the security algorithm supported by both the first UE and the second UE.

The second control network element sends the second ordered algorithms list to the first control network element, and the first control network element selects, from the intersection of the first ordered algorithms list and the second ordered algorithms list using the algorithm selection policy, the security algorithm supported by both the first UE and the second UE.

Correspondingly, step S102 of notifying, by the control network element, the selected security algorithm to the first UE and the second UE may be further includes sending, by the first control network element, the selected security algorithm to the first UE, and sending, by the second control network element, the selected security algorithm to the second UE.

In the foregoing processes, that a control network element selects, according to the intersection of the preconfigured security algorithm priority list and the security algorithm that is supported by the first UE, the first ordered algorithms list corresponding to the first UE and that a control network element selects, according to the intersection of the preconfigured security algorithm priority list and the security algorithm that is supported by the second UE, the second ordered algorithms list corresponding to the second UE may both be implemented by the following specific implementation manner.

The control network element performs sorting according to a priority on an intersection of a security algorithm list supported by UE and the preconfigured security algorithm priority list. Moreover, selecting, by a control network element from the intersection of the first ordered algorithms list and the second ordered algorithms list using the algorithm selection policy, the security algorithm supported by both the first UE and the second UE may further include traversing the first ordered algorithms list and the second ordered algorithms list in a descending order of priority, and selecting a same security algorithm that appears first and that has same priorities as the security algorithm supported by both the first UE and the second UE.

In addition, if in the foregoing processes, if determining that there is no intersection of security algorithms, the control network element uses a preset security algorithm as the security algorithm supported by both the first UE and the second UE.

Figure 2:
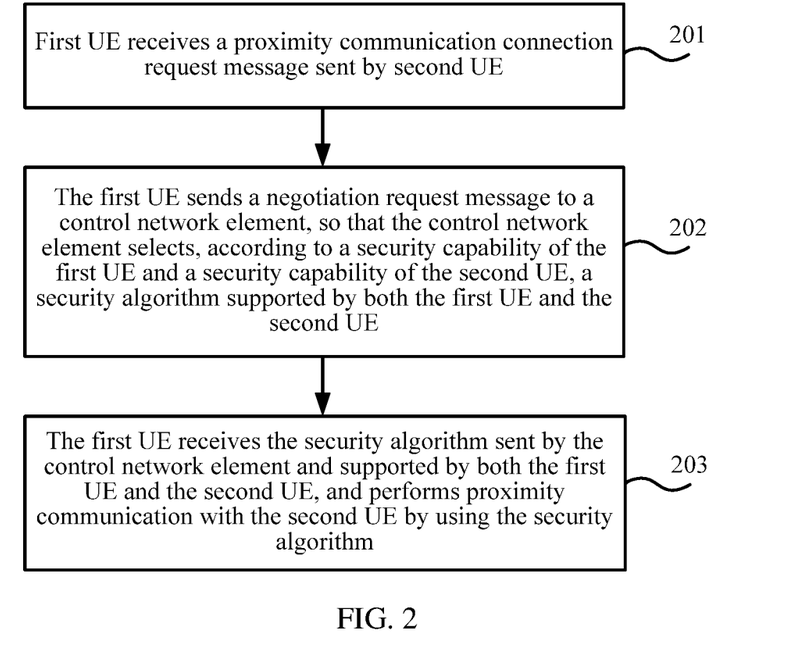
FIG. 2 is a flowchart of Embodiment 2 of a negotiation processing method for a security algorithm according to the present disclosure.

FIG. 2 is a flowchart of Embodiment 2 of a negotiation processing method for a security algorithm according to the present disclosure. As shown in FIG. 2, the method in this embodiment is a processing process, which corresponds to a processing process of the control network element shown in FIG. 1, of first UE. The method in this embodiment may include the following steps.

Step S201: First UE receives a proximity communication connection request message sent by second UE.

Step S202: The first UE sends a request message to a control network element such that the control network element selects, according to a security capability of the first UE and a security capability of the second UE, a security algorithm supported by both the first UE and the second UE.

Step S203: The first UE receives the security algorithm sent by the control network element and supported by both the first UE and the second UE, and performs proximity communication with the second UE using the security algorithm.

Further, before performing step S201, the first UE may further send a security capability of the first UE to the control network element in a process in which the first UE is attached to the control network element.

Furthermore, if the first UE and the second UE are attached to different control network elements, in S202, the first UE may send the request message to a first control network element attached by the first UE. Correspondingly, in S203, the first UE may receive the security algorithm sent by the first control network element and supported by both the first UE and the second UE.

The security algorithm sent by the control network element to the first UE and supported by both the first UE and the second UE may be a security algorithm selected in each technical solution in the method embodiment shown in FIG. 1, and details are not described herein again.

Figure 3:
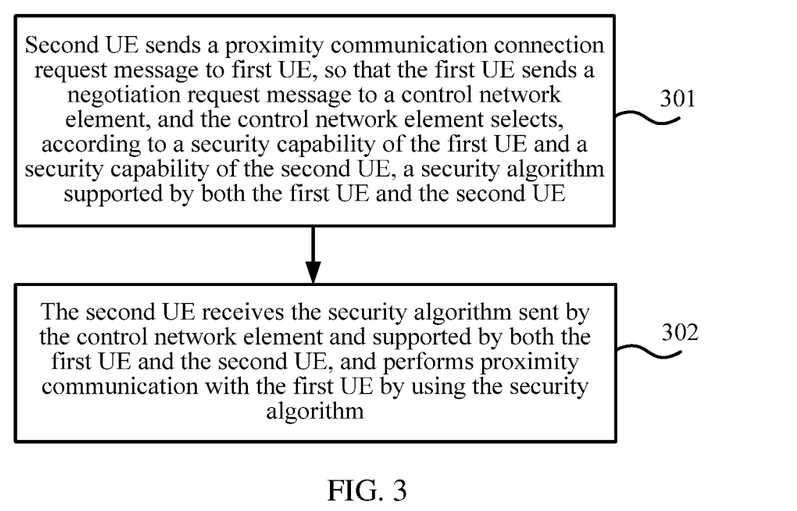
FIG. 3 is a flowchart of Embodiment 3 of a negotiation processing method for a security algorithm according to the present disclosure.

FIG. 3 is a flowchart of Embodiment 3 of a negotiation processing method for a security algorithm according to the present disclosure. As shown in FIG. 3, the method in this embodiment is a processing process, which corresponds to a processing process of the control network element shown in FIG. 1 and a processing process of the first UE shown in FIG. 2, of second UE. The method in this embodiment may include the following steps.

Step S301: Second UE sends a proximity communication connection request message to first UE such that the first UE sends a request message to a control network element, and the control network element selects, according to a security capability of the first UE and a security capability of the second UE, a security algorithm supported by both the first UE and the second UE.

Step S302: The second UE receives the security algorithm sent by the control network element and supported by both the first UE and the second UE, and performs proximity communication with the first UE using the security algorithm.

Further, before performing step S301, the second UE may further send a security capability of the second UE to the control network element in a process in which the second UE is attached to the control network element.

Furthermore, if the first UE and the second UE are attached to different control network elements, in step S302, the second UE may receive the security algorithm supported by both the first UE and the second UE and sent by the second control network element attached by the second UE.

The security algorithm sent by the control network element to the second UE and supported by both the first UE and the second UE may be a security algorithm selected in each technical solution in the method embodiment shown in FIG. 1, and details are not described herein again.

In the present disclosure, the control network element in the foregoing embodiments may be any network element, which has a control function, in a network architecture. For example, in a long term evolution (LTE) network, the control network element may be a MME.

In the foregoing embodiments, when first UE and second UE that need to perform proximity communication negotiate a security algorithm, a control network element on a network side may participate and control a process of the negotiation and a negotiation result. As a decision maker on a security algorithm, the control network element may select, according to a security capability of the first UE and a security capability of the second UE, a security algorithm supported by both the UEs, and notify the security algorithm to both the UEs such that the first UE and the second UE can perform proximity communication using the notified security algorithm. In the embodiments, the control network element may be a control network element in an existing network architecture such that the control network element is compatible with the existing network architecture. Moreover, the control network element may be maintained by an operator, and therefore, the operator may participate and control a process of negotiating a security algorithm and a negotiation result, thereby ensuring controllability of negotiation. Moreover, if a control network element controlled by the operator performs a process of negotiating a security algorithm, unreliability of selection of a security algorithm by only UE can be avoided. In addition, because security capabilities of the first UE and the second UE may be transmitted to the control network element in a process in which the first UE and the second UE are attached to the control network element, in the embodiments, an existing process of transmitting network signaling may further be used, thereby achieving compatibility with an existing process of network communication.

The following describes the technical solutions of the present disclosure in detail using an example in which the first UE and the second UE are attached to different MMEs.

Figure 4:
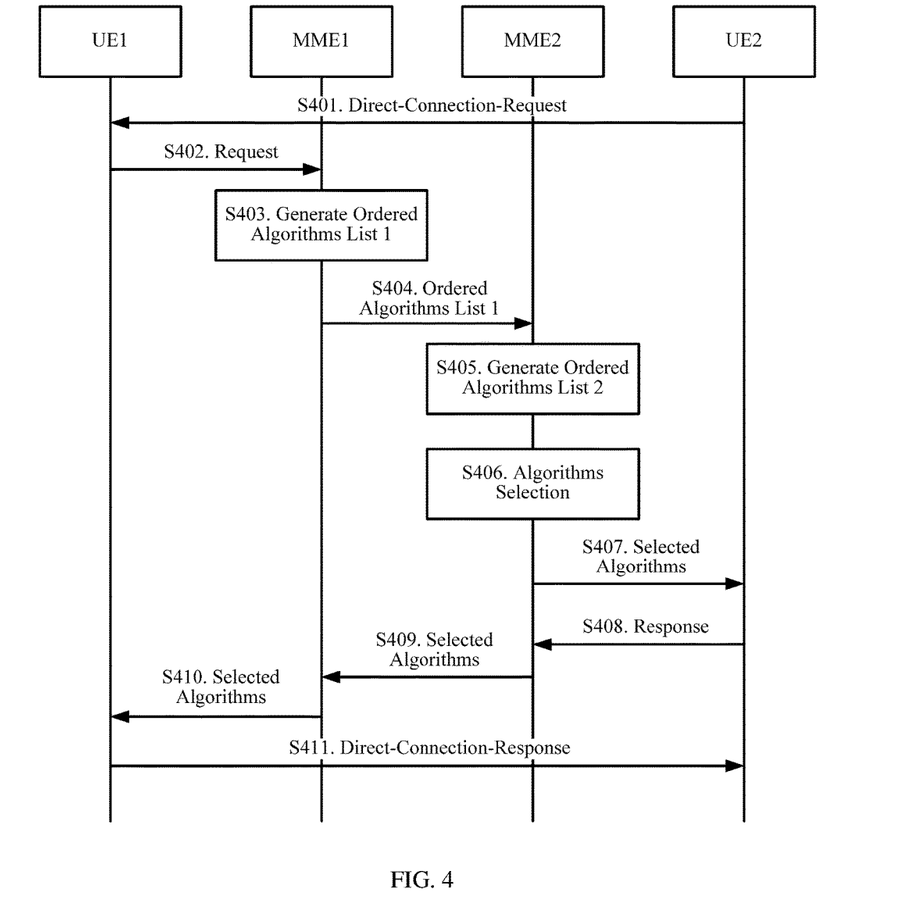
FIG. 4 is a signaling flowchart of Embodiment 4 of a negotiation processing method for a security algorithm according to the present disclosure.

FIG. 4 is a signaling flowchart of Embodiment 4 of a negotiation processing method for a security algorithm according to the present disclosure. As shown in FIG. 4, the method in this embodiment may include the following steps.

Step S401: UE 2 sends a direct connection request to UE 1, to request the UE 1 to perform proximity communication.

Step S402: The UE 1 sends a request message to an MME 1.

Step S403: The MME 1 generates, according to a security capability of the UE 1 and a system preconfigured security algorithm priority list, an ordered algorithms list 1 corresponding to the UE 1.

The system preconfigured security algorithm priority list may be preconfigured by an operator inside the MME.

In specific implementation, a process of generating the Ordered Algorithms List 1 may include performing sorting according to a priority on an intersection of a security algorithm list supported by the UE 1 and the preconfigured security algorithm priority list. For example, the preconfigured security algorithm priority list is: A, C, D, and B (in a descending order of priority), and security algorithms included in Security Capability of the UE 1 are: A, B, and C. Therefore, a generated Ordered Algorithms List 1 is: A, C, and B (in a descending order of priority).

Step S404: The MME 1 sends the ordered algorithms list 1 to an MME 2.

Step S405: The MME 2 generates, according to a security capability of the UE 2 and the system preconfigured security algorithm priority list, an ordered algorithms list 2 corresponding to the UE 2.

A process of generating the ordered algorithms list 2 is similar to the foregoing process of generating the ordered algorithms list 1. Details are not described herein again.

Step S406: The MME 2 selects, from an intersection of the ordered algorithms list 1 and the ordered algorithms list 2 by performing an algorithm selection policy, a security algorithm supported by both the first UE and the second UE.

The Algorithms Selection policy may be, for example traversing the ordered algorithms list 1 and the ordered algorithms list 2 in a descending order of priority, and selecting a same security algorithm that appears first and that has same priorities as the security algorithm supported by both the first UE and the second UE.

For example, the ordered algorithms list 1 includes algorithms: A, B, and C (in a descending order of priority), and the ordered algorithms list 2 includes algorithms: C, B, and A (in a descending order of priority). Therefore, a selected algorithms policy is performed, that is, B is selected as the security algorithm supported by both the first UE and the second UE.

If a security algorithm meeting a condition does not exist in the ordered algorithms list 1 and the ordered algorithms list 2 after traversing by performing the algorithms selection policy ends, the selected algorithms policy may select a preconfigured default algorithm as a security algorithm supported by both the first UE and the second UE. The preconfigured default algorithm may be a security algorithm that is supported by both the UE 1 and the UE 2 and that is selected by a system based on the security capability of the UE 1 and the security capability of the UE 2, and is preconfigured in an MME.

For example, the ordered algorithms list 1 includes algorithms A and B, and the ordered algorithms list 2 includes algorithms B and A. Therefore, when the algorithms selection policy is performed, a preconfigured default algorithm is selected as the security algorithm supported by both the first UE and the second UE.

Step S407: The MME 2 sends the selected security algorithm to the UE 2.

Step S408: The UE 2 sends a response to the MME 2.

Step S409: The MME 2 sends the selected algorithms to the MME 1.

Step S410: The MME 1 sends the selected algorithms to the UE 1.

Step S411: The UE 1 sends a connection request response to the UE 2.

It should be noted that, step S407 and step S408 may be put after step S409, that is, the MME 2 sends the selected algorithms to the MME 1, and the MME 2 then sends the selected algorithms to the UE 2.

In this embodiment, when UE 1 and UE 2 that need to perform proximity communication negotiate a security algorithm, an MME 1 in which the UE 1 is located may select, according to a system preconfigured security algorithm priority list and a security capability of the UE 1, an ordered algorithms list corresponding to the UE 1, and send the ordered algorithms list to an MME 2 in which the UE 2 is located. The MME 2 may select, according to the system preconfigured security algorithm priority list and a security capability of the UE 2, an ordered algorithms list corresponding to the UE 2, and next, the MME 2 may select, from the two ordered algorithms lists using an algorithm selection policy, a security algorithm supported by both the UE 1 and the UE 2, notify the selected security algorithm to the UE 2, and notify the selected algorithm to the UE 1 using the MME 1 such that the UE1 and the UE2 can perform proximity communication using the notified security algorithm. In this embodiment, the security algorithm priority list may be a list maintained by an operator in an MME, and therefore, the operator can control a negotiation result of a security algorithm of the UE 1 and UE 2. Moreover, if an MME controlled by the operator selects a security algorithm, unreliability of selection of a security algorithm by only UE can be avoided.

Figure 5:
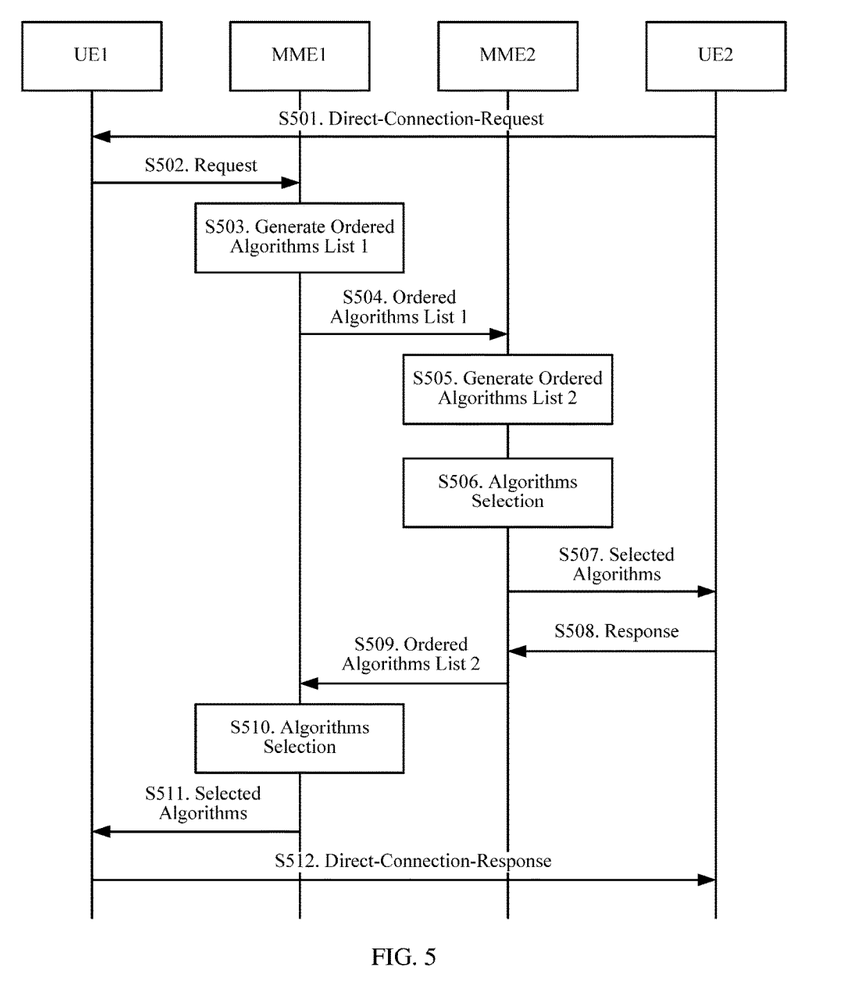
FIG. 5 is a signaling flowchart of Embodiment 5 of a negotiation processing method for a security algorithm according to the present disclosure.

FIG. 5 is a signaling flowchart of Embodiment 5 of a negotiation processing method for a security algorithm according to the present disclosure. As shown in FIG. 5, this embodiment differs from the embodiment in FIG. 4 in that, in the embodiment shown in FIG. 4, the MME 2 selects the security algorithm and notifies the security algorithm to the UE 2, and the security algorithm is notified to the UE 1 using the MME 1, while the MME 1 does not select a security algorithm. However, in this embodiment, the MME 1 and the MME 2 may exchange the security algorithm list of the UE 1 and the security algorithm list of the UE 2, and next, the MME 1 may select a security algorithm for the UE 1 and notifies the security algorithm to the UE 1, and the MME 2 may select a security algorithm for the UE 2 and notifies the security algorithm to the UE 2, where the MME 1 and the MME 2 use a same algorithm selection policy, and therefore, the security algorithm selected by the MME 1 for the UE 1 is the same as the security algorithm selected by the MME 2 for the UE 2.

Furthermore, this embodiment may include the following steps.

Step S501: UE 2 sends a connection request to UE 1, to request the UE 1 to perform proximity communication.

Step S502: The UE 1 sends a request message to an MME 1.

Step S503: The MME 1 generates, according to a security capability of the UE 1 and a system preconfigured security algorithm priority list, an ordered algorithms list 1 corresponding to the UE 1.

Step S504: The MME 1 sends the ordered algorithms list 1 to an MME 2.

Step S505: The MME 2 generates, according to a security capability of the UE 2 and the system preconfigured security algorithm priority list, an ordered algorithms list 2 corresponding to the UE 2.

Step S506: The MME 2 selects, from an intersection of the ordered algorithms list 1 and the ordered algorithms list 2 by performing an algorithm selection policy, a security algorithm supported by both the UE 1 and the UE 2.

Step S507: The MME 2 sends the selected security algorithm to the UE 2.

Step S508: The UE 2 sends a response to the MME 2.

Step S509: The MME 2 sends the ordered algorithms list 2 to the MME 1.

Step S510: The MME 1 selects, from the intersection of the ordered algorithms list 1 and the ordered algorithms list 2 by performing the algorithm selection policy, a security algorithm supported by both the UE 1 and the UE 2.

Step S511: The MME 1 sends the selected security algorithm to the UE 1.

Step S512: The UE 1 sends a connection request response to the UE 2.

It should be noted that, step S509 only needs to be performed after step S505, and it is not required to limit that step S509 is performed after step S508, that is, a process in which the MME 2 selects a security algorithm for the UE 2 may be parallel with a process in which the MME 1 selects a security algorithm for the UE 1.

In this embodiment, when UE 1 and UE 2 that need to perform proximity communication negotiate a security algorithm, an MME 1 in which the UE 1 is located may select, according to a system preconfigured security algorithm priority list and a security capability of the UE 1, an ordered algorithms list corresponding to the UE 1, and send the ordered algorithms list to an MME 2 in which the UE 2 is located. The MME 2 may select, according to the system preconfigured security algorithm priority list and a security capability of the UE 2, an ordered algorithms list corresponding to the UE 2, and next, the MME 2 may select, from the two ordered algorithms lists using an algorithm selection policy, a security algorithm supported by both the UE 1 and the UE 2, and notify the selected security algorithm to the UE 2. Similarly, the MME 2 may send, to the MME 1, the security algorithm list corresponding to the UE 2, and then the MME 1 may select, from the two ordered algorithms lists using an algorithm selection policy, a security algorithm supported by both the UE 1 and the UE 2, and notify the selected security algorithm to the UE 1 such that the UE 1 and the UE 2 may perform proximity communication using the notified security algorithm. In this embodiment, the security algorithm priority list may be a list maintained by an operator in an MME, and therefore, the operator can control a negotiation result of a security algorithm of the UE 1 and UE 2. Moreover, if an MME controlled by the operator selects a security algorithm, unreliability of selection of a security algorithm by only UE can be avoided.

Figure 6:
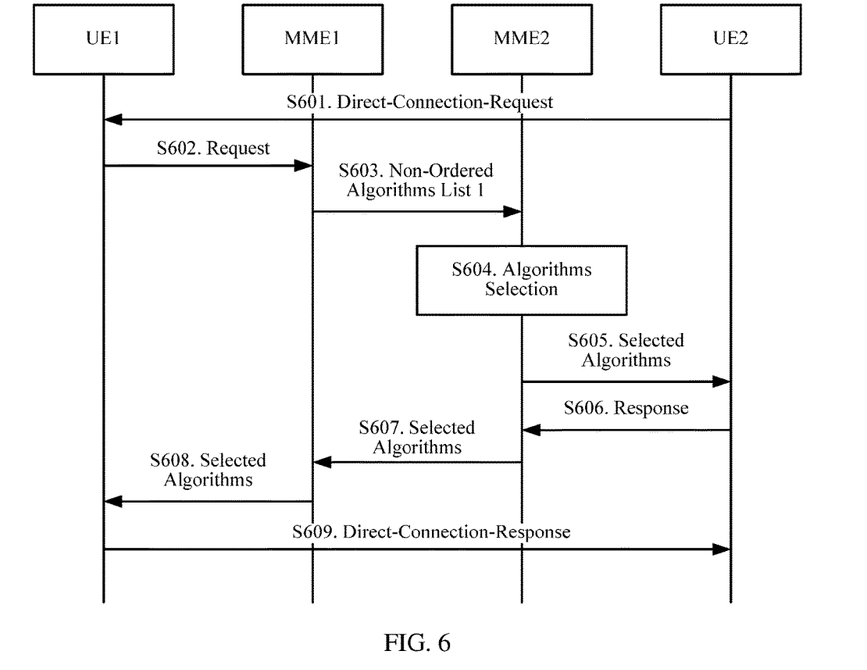
FIG. 6 is a signaling flowchart of Embodiment 6 of a negotiation processing method for a security algorithm according to the present disclosure.

FIG. 6 is a signaling flowchart of Embodiment 6 of a negotiation processing method for a security algorithm according to the present disclosure. As shown in FIG. 6, this embodiment differs from the embodiment in FIG. 4 in that, in the embodiment shown in FIG. 4, both the MME 1 and the MME 2 need to select, based on the system preconfigured security algorithm priority list, security algorithm lists that correspond to UEs, that is, a priority sorting process needs to be performed. However, in this embodiment, the priority sorting process is omitted, the security algorithm list sent by the MME 1 to the MME 2 is the security algorithm supported by the UE 1, and moreover, when selecting, for the UE 1 and the UE 2, the security algorithm supported by both the first UE and the second UE, the MME 2 may randomly select a security algorithm from the intersection of two security algorithm lists without using the algorithm selection policy.

Furthermore, this embodiment may include the following steps.

Step S601: UE 2 sends a connection request to UE 1, to request the UE 1 to perform proximity communication.

Step S602: The UE 1 sends a request message to an MME 1.

Step S603: The MME 1 sends a non-ordered algorithms list 1 to an MME 2.

The non-ordered algorithms list 1 includes a security algorithm supported by the UE 1, and the priority sorting in the embodiment shown in FIG. 4 or FIG. 5 does not need to be performed.

The MME 1 may learn, according to a security capability of the UE 1, the security algorithm supported by the UE 1.

The non-ordered algorithms list 1 may be an intersection of a security algorithm list supported by the UE 1 and a system preconfigured security algorithm list in the MME 1 but does not include a priority.

Step S604: The MME 2 selects, from an intersection of the non-ordered algorithms list 1 and the non-ordered algorithms list 2 by performing an algorithm selection policy, a security algorithm supported by both the UE 1 and the UE 2.

The Non-Ordered Algorithms List 2 includes a security algorithm supported by the UE 2, and priority sorting in the embodiment shown in FIG. 4 or FIG. 5 does not need to be performed.

The MME 2 may learn, according to a security capability of the UE 2, the security algorithm supported by the UE 2.

The non-ordered algorithms list 2 may be an intersection of a security algorithm list supported by the UE 2 and a system preconfigured security algorithm list in the MME 2 but does not include a priority.

Furthermore, the MME 2 may randomly select, from the intersection of the non-ordered algorithms list 1 and the non-ordered algorithms list 2, an algorithm supported by both the UE 1 and the UE 2 as the selected algorithms. For example, the non-ordered algorithms list 1 includes B, C, and D, and the non-ordered algorithms list 2 includes A, B, and D. Therefore, the MME 2 randomly selects, from B and D, an algorithm as the selected algorithms. If there is no intersection of the non-ordered algorithms list 1 and the non-ordered algorithms list 2, in this case, the MME 2 may use a preconfigured default algorithm as the selected algorithms. The preconfigured default algorithm may be a security algorithm selected by a system based on the security capability of the UE 1 and the security capability of the UE 2 and supported by both the UE 1 and the UE 2, and is preconfigured in the MME 2.

Step S605: The MME 2 sends the selected security algorithm to the UE 2.

Step S606: The UE 2 sends a response to the MME 2.

Step S607: The MME 2 sends the selected algorithms to the MME 1.

Step S608: The MME 1 sends the selected algorithms to the UE 1.

Step S609: The UE 1 sends a connection request response to the UE 2.

It needs to be noted that, step S605 and step S606 may be put after step S607, that is, after the MME 2 sends the selected algorithms to the MME 1, the MME 2 then sends the selected algorithms to the UE 2.

In this embodiment, when UE 1 and UE 2 that need to perform proximity communication negotiate a security algorithm, an MME 1 in which the UE 1 is located may send a list including a security algorithm supported by the UE 1 to an MME 2 in which the UE 2 is located, and the MME 2 may randomly select, from a security algorithm supported by the UE 1 and a security algorithm supported by the UE 2 using an algorithm selection policy, a security algorithm supported by both the UE 1 and the UE 2, notify the selected security algorithm to the UE 2, and notify the selected algorithm to the UE 1 using the MME 1 such that the UE 1 and the UE 2 may perform proximity communication using the notified security algorithm. In this embodiment, an operator can control a negotiation result of a security algorithm of the UE 1 and UE 2. Moreover, if an MME controlled by the operator selects a security algorithm, unreliability of selection of a security algorithm by only UE can be avoided.

Figure 7:
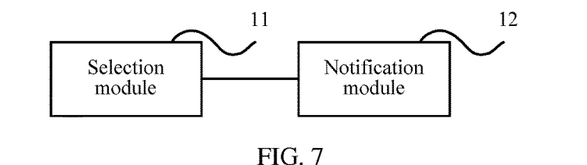
FIG. 7 is a schematic structural diagram of an embodiment of a control network element according to the present disclosure.

FIG. 7 is a schematic structural diagram of an embodiment of a control network element according to the present disclosure. As shown in FIG. 7, the control network element in this embodiment may include a selection module 11 and a notification module 12.

The selection module 11 is configured to select, according to a security capability of first UE and a security capability of second UE, a security algorithm supported by both the first UE and the second UE.

The notification module 12 is configured to notify the selected security algorithm to the first UE and the second UE.

Optionally, the selection module 11 is further configured to randomly select, from an intersection of a security algorithm supported by the first UE and included in the security capability of the first UE and a security algorithm supported by the second UE and included in the security capability of the second UE, one security algorithm as the security algorithm supported by both the first UE and the second UE, or select, according to an intersection of a preconfigured security algorithm priority list and a security algorithm that is supported by the first UE, a first ordered algorithms list corresponding to the first UE, select, according to an intersection of the security algorithm priority list and a security algorithm that is supported by the second UE, a second ordered algorithms list corresponding to the second UE, and select, from an intersection of the first ordered algorithms list and the second ordered algorithms list using an algorithm selection policy, the security algorithm supported by both the first UE and the second UE.

The selection module 11 is further configured to traverse the first ordered algorithms list and the second ordered algorithms list in a descending order of priority, and select a same security algorithm that appears first and that has same priorities as the security algorithm supported by both the first UE and the second UE.

In addition, the selection module 11 is further configured to use a preset default security algorithm as the security algorithm supported by both the first UE and the second UE if there is no intersection of security algorithms.

The foregoing control network element may be, for example, a MME.

The control network element in this embodiment of the present disclosure may be configured to perform Method Embodiment 1 shown in FIG. 1. An implementation principle and a technical effect thereof are similar and details are not described herein again.

Figure 8:
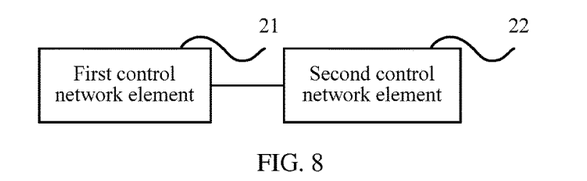
FIG. 8 is a schematic structural diagram of an embodiment of a control system according to the present disclosure.

FIG. 8 is a schematic structural diagram of an embodiment of a control system according to the present disclosure. As shown in FIG. 8, the control system in this embodiment may include a first control network element 21 attached by first UE and a second control network element 22 attached by second UE, where the first control network element 21 and the second control network element 22 interact, according to a security capability of the first UE and a security capability of the second UE, the first UE and the second UE.

Furthermore, the first control network element 21 and the second control network element 22 interact in order to randomly select, from an intersection of a security algorithm supported by the first UE and included in the security capability of the first UE and a security algorithm supported by the second UE and included in the security capability of the second UE, one security algorithm as the security algorithm supported by both the first UE and the second UE.

Optionally, the first control network element 21 is further configured to send a first algorithm list to the second control network element 22, where the first algorithm list includes the security algorithm supported by the first UE.

Correspondingly, the second control network element 22 is further configured to randomly select, from an intersection of the first algorithm list and a second algorithm list that includes the security algorithm supported by the second UE, one security algorithm as the security algorithm supported by both the first UE and the second UE.

Optionally, the first control network element 21 is further configured to select, according to an intersection of a preconfigured security algorithm list and a security algorithm list that is supported by the first UE, a first algorithm list corresponding to the first UE, and send the first algorithm list to the second control network element 22.

Correspondingly, the second control network element 22 is further configured to select, according to an intersection of the preconfigured security algorithm list and a security algorithm list that is supported by the second UE, a second algorithm list corresponding to the second UE, and randomly select, from an intersection of the first algorithm list and the second algorithm list, one security algorithm as the security algorithm supported by both the first UE and the second UE.

Optionally, the first control network element 21 and the second control network element 22 interact in order to select, according to an intersection of a preconfigured security algorithm priority list and a security algorithm that is supported by the first UE, a first ordered algorithms list corresponding to the first UE, select, according to an intersection of the security algorithm priority list and a security algorithm that is supported by the second UE, a second ordered algorithms list corresponding to the second UE, and select, from an intersection of the first ordered algorithms list and the second ordered algorithms list using an algorithm selection policy, the security algorithm supported by both the first UE and the second UE.

Further, the first control network element 21 is further configured to select, according to the intersection of the preconfigured security algorithm priority list and the security algorithm that is supported by the first UE, the first ordered algorithms list corresponding to the first UE, and send the first ordered algorithms list to the second control network element 22.

The second control network element 22 is further configured to select, according to the intersection of the security algorithm priority list and the security algorithm that is supported by the second UE, the second ordered algorithms list corresponding to the second UE, and select, from the intersection of the first ordered algorithms list and the second ordered algorithms list using the algorithm selection policy, the security algorithm supported by both the first UE and the second UE.

The second control network element 22 is further configured to send the selected security algorithm to the second UE, and the second control network element sends the selected security algorithm to the first UE using the first control network element.

Optionally, the first control network element 21 is further configured to select, according to the intersection of the preconfigured security algorithm priority list and the security algorithm that is supported by the first UE, the first ordered algorithms list corresponding to the first UE, and send the first ordered algorithms list to the second control network element 22.

The second control network element 22 is further configured to select, according to the intersection of the security algorithm priority list and the security algorithm that is supported by the second UE, the second ordered algorithms list corresponding to the second UE, select, from the intersection of the first ordered algorithms list and the second ordered algorithms list using the algorithm selection policy, the security algorithm supported by both the first UE and the second UE, and send the second ordered algorithms list to the first control network element 21.

Correspondingly, the first control network element 21 is further configured to select, from the intersection of the first ordered algorithms list and the second ordered algorithms list using the algorithm selection policy, the security algorithm supported by both the first UE and the second UE.

The first control network element 21 is further configured to send the selected security algorithm to the first UE.

The second control network element 22 is further configured to send the selected security algorithm to the second UE.

The foregoing control network element may be, for example, a MME.

For interaction processes between the first control network element and the second control network element and two UEs, reference may be made to any of technical solutions shown in FIG. 4 to FIG. 7. An implementation principle and a technical effect thereof are similar and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A negotiation processing method for a security algorithm, comprising:
   selecting, by a control network element according to a security capability of a first user equipment (UE) and a security capability of a second UE, the security algorithm supported by both the first UE and the second UE; and
   notifying, by the control network element, the selected security algorithm to the first UE and the second UE, and
   wherein selecting, by the control network element according to the security capability of the first UE and the security capability of the second UE, the security algorithm supported by both the first UE and the second UE comprises:
      selecting, by the control network element according to an intersection of a preconfigured security algorithm priority list and a security algorithm list that is supported by the first UE, a first ordered algorithms list corresponding to the first UE;
      selecting, according to an intersection of the preconfigured security algorithm priority list and the security algorithm list that is supported by the second UE, a second ordered algorithms list corresponding to the second UE; and
      selecting, from an intersection of the first ordered algorithms list corresponding to the first UE and the second ordered algorithms list corresponding to the second UE using an algorithm selection policy, the security algorithm supported by both the first UE and the second UE.

2. The method according to claim 1, wherein the control network element comprises a first control network element attached by the first UE and a second control network element attached by the second UE, wherein selecting, by the control network element according to the intersection of the preconfigured security algorithm priority list and the security algorithm list that is supported by the first UE, the first ordered algorithms list corresponding to the first UE, wherein selecting, according to the intersection of the preconfigured security algorithm priority list and the security algorithm list that is supported by the second UE, the second ordered algorithms list corresponding to the second UE, and wherein selecting, from the intersection of the first ordered algorithms list and the second ordered algorithms list using the algorithm selection policy, the security algorithm supported by both the first UE and the second UE comprise:
   selecting, by the first control network element according to the intersection of the preconfigured security algorithm priority list and the security algorithm list that is supported by the first UE, the first ordered algorithms list corresponding to the first UE;
   sending the first ordered algorithms list to the second control network element;
   selecting, by the second control network element according to the intersection of the preconfigured security algorithm priority list and the security algorithm list that is supported by the second UE, the second ordered algorithms list corresponding to the second UE; and
   selecting, from the intersection of the first ordered algorithms list and the second ordered algorithms list using the algorithm selection policy, the security algorithm supported by both the first UE and the second UE.

3. The method according to claim 1, wherein the control network element comprises a first control network element attached by the first UE and a second control network element attached by the second UE, wherein selecting, by the control network element according to the intersection of the preconfigured security algorithm priority list and the security algorithm list that is supported by the first UE, the first ordered algorithms list corresponding to the first UE, wherein selecting, according to the intersection of the preconfigured security algorithm priority list and the security algorithm list that is supported by the second UE, the second ordered algorithms list corresponding to the second UE, and wherein selecting, from the intersection of the first ordered algorithms list and the second ordered algorithms list using the algorithm selection policy, the security algorithm supported by both the first UE and the second UE comprise:
   selecting, by the first control network element according to the intersection of the preconfigured security algorithm priority list and the security algorithm list that is supported by the first UE, the first ordered algorithms list corresponding to the first UE;
   sending the first ordered algorithms list to the second control network element;
   selecting, by the second control network element according to the intersection of the preconfigured security algorithm priority list and the security algorithm list that is supported by the second UE, the second ordered algorithms list corresponding to the second UE;
   selecting, from the intersection of the first ordered algorithms list and the second ordered algorithms list by the second control network element using the algorithm selection policy, the security algorithm supported by both the first UE and the second UE;
   sending, by the second control network element, the second ordered algorithms list to the first control network element; and
   selecting, by the first control network element from the intersection of the first ordered algorithms list and the second ordered algorithms list using the algorithm selection policy, the security algorithm supported by both the first UE and the second UE.

4. The method according to claim 3, wherein notifying, by the control network element, the selected security algorithm to the first UE and the second UE comprises:
   sending, by the first control network element, the selected security algorithm to the first UE; and
   sending, by the second control network element, the selected security algorithm to the second UE.

5. The method according to claim 1, further comprising using a preset default security algorithm as the security algorithm supported by both the first UE and the second UE, when there is no intersection of security algorithms.

6. A control network element, comprising:
   a memory; and
   a computer processor coupled to the memory and configured to:
      select, according to a security capability of a first user equipment (UE) and a security capability of a second UE, a security algorithm supported by both the first UE and the second UE;
      select, according to an intersection of a preconfigured security algorithm priority list and a security algorithm list that is supported by the first UE, a first ordered algorithms list corresponding to the first UE;

select, according to an intersection of the preconfigured security algorithm priority list and a security algorithm list that is supported by the second UE, a second ordered algorithms list corresponding to the second UE;

select, from an intersection of the first ordered algorithms list corresponding to the first UE and the second ordered algorithms list corresponding to the second UE using an algorithm selection policy, the security algorithm supported by both the first UE and the second UE; and notify the selected security algorithm to the first UE and the second UE.

7. The control network element according to claim 6, wherein the computer processor is further configured to use a preset default security algorithm as the security algorithm supported by both the first UE and the second UE when there is no intersection of security algorithms.

8. The control network element according to claim 6, wherein the control network element is a mobility management entity (MME).

9. A control system, comprising:
a first control network element attached by a first user equipment (UE); and
a second control network element attached by a second UE,
wherein the first control network element and the second control network element interact in order to:
select, according to a security capability of the first UE and a security capability of the second UE, a security algorithm supported by both the first UE and the second UE;
select, according to an intersection of a preconfigured security algorithm priority list and a security algorithm list that is supported by the first UE, a first ordered algorithms list corresponding to the first UE;
select, according to an intersection of the preconfigured security algorithm priority list and the security algorithm list that is supported by the second UE, a second ordered algorithms list corresponding to the second UE;
select, from an intersection of the first ordered algorithms list corresponding to the first UE and the second ordered algorithms list corresponding to the second UE using an algorithm selection policy, the security algorithm supported by both the first UE and the second UE; and
notify the selected security algorithm to the first UE and the second UE.

10. The system according to claim 9, wherein the first control network element is configured to:
select, according to the intersection of the preconfigured security algorithm priority list and the security algorithm list that is supported by the first UE, the first ordered algorithms list corresponding to the first UE; and
send the first ordered algorithms list to the second control network element, and
wherein the second control network element is configured to:
select, according to the intersection of the preconfigured security algorithm priority list and the security algorithm list that is supported by the second UE, the second ordered algorithms list corresponding to the second UE; and
select, from the intersection of the first ordered algorithms list and the second ordered algorithms list using the algorithm selection policy, the security algorithm supported by both the first UE and the second UE.

11. The system according to claim 9, wherein the second control network element is configured to:
send the selected security algorithm to the second UE; and
send the selected security algorithm to the first UE using the first control network element.

12. The system according to claim 9, wherein the first control network element is configured to send the selected security algorithm to the first UE, and wherein the second control network element is configured to send the selected security algorithm to the second UE.

13. The system according to claim 9, wherein the first control network element and the second control network element are mobility management entities (MMEs).

14. A negotiation processing method for a security algorithm, comprising:
selecting, by a control network element according to a security capability of a first user equipment (UE) and a security capability of a second UE, the security algorithm supported by both the first UE and the second UE; and
notifying, by the control network element, the selected security algorithm to the first UE and the second UE,
wherein selecting, by the control network element according to the security capability of the first UE and the security capability of the second UE, the security algorithm supported by both the first UE and the second UE comprises:
selecting, by the control network element according to an intersection of a preconfigured security algorithm priority list and a security algorithm list that is supported by the first UE, a first ordered algorithms list corresponding to the first UE;
selecting, according to an intersection of the preconfigured security algorithm priority list and the security algorithm list that is supported by the second UE, a second ordered algorithms list corresponding to the second UE; and
selecting, from an intersection of the first ordered algorithms list and the second ordered algorithms list using an algorithm selection policy, the security algorithm supported by both the first UE and the second UE,
wherein the control network element comprises a first control network element attached by the first UE and a second control network element attached by the second UE, and
wherein selecting, by the control network element according to the intersection of the preconfigured security algorithm priority list and the security algorithm list that is supported by the first UE, the first ordered algorithms list corresponding to the first UE, wherein selecting, according to the intersection of the preconfigured security algorithm priority list and the security algorithm list that is supported by the second UE, the second ordered algorithms list corresponding to the second UE, and wherein selecting, from the intersection of the first ordered algorithms list and the second ordered algorithms list using the algorithm selection policy, the security algorithm supported by both the first UE and the second UE comprise:
selecting, by the first control network element according to the intersection of the preconfigured security algorithm priority list and the security algorithm list that is supported by the first UE, the first ordered algorithms list corresponding to the first UE;

sending the first ordered algorithms list to the second control network element;

selecting, by the second control network element according to the intersection of the preconfigured security algorithm priority list and the security algorithm list that is supported by the second UE, the second ordered algorithms list corresponding to the second UE;

selecting, from the intersection of the first ordered algorithms list and the second ordered algorithms list by the second control network element using the algorithm selection policy, the security algorithm supported by both the first UE and the second UE;

sending, by the second control network element, the second ordered algorithms list to the first control network element; and selecting, by the first control network element from the intersection of the first ordered algorithms list and the second ordered algorithms list using the algorithm selection policy, the security algorithm supported by both the first UE and the second UE.

15. The method according to claim 14, wherein notifying, by the control network element, the selected security algorithm to the first UE and the second UE comprises:

sending, by the first control network element, the selected security algorithm to the first UE; and sending, by the second control network element, the selected security algorithm to the second UE.

* * * * *

UNITED STATES PATENT AND TRADEMARK OFFICE
CERTIFICATE OF CORRECTION

PATENT NO. : 10,028,136 B2
APPLICATION NO. : 15/143095
DATED : July 17, 2018
INVENTOR(S) : Bo Zhang, Chengdong He and Lu Gan It is certified that error appears in the above-identified patent and that said Letters Patent is hereby corrected as shown below:

On the Title Page

Item (30), Line 1: "201310539031" should be "201310539031.X"

In the Claims

Column 21, Line 2 in Claim 6: "a" should be "the"

Signed and Sealed this
Twenty-eighth Day of August, 2018

Andrei Iancu
*Director of the United States Patent and Trademark Office*